United States Patent
Konigorski

(10) Patent No.: US 7,776,295 B2
(45) Date of Patent: Aug. 17, 2010

(54) FLYING APPARATUS AND METHOD FOR REMOVING HARMFUL GASES FROM THE ATMOSPHERE

(75) Inventor: Detlev Konigorski, Ehrenburg (DE)

(73) Assignee: Astrium GmbH, Ottobrunn (DE)

( * ) Notice: Subject to any disclaimer, the term of this patent is extended or adjusted under 35 U.S.C. 154(b) by 0 days.

(21) Appl. No.: 12/380,729

(22) Filed: Mar. 2, 2009

(65) Prior Publication Data

US 2009/0238741 A1 Sep. 24, 2009

(30) Foreign Application Priority Data

Mar. 18, 2008 (DE) .................. 10 2008 015 080

(51) Int. Cl.
  *B01D 53/34* (2006.01)
  *B01D 53/74* (2006.01)
  *B64B 1/00* (2006.01)
  *B64B 1/06* (2006.01)
(52) U.S. Cl. .............. 423/210; 422/129; 422/168; 422/187; 244/24; 244/31; 244/900; 244/2; 244/4 R; 244/30
(58) Field of Classification Search ............... 423/210; 422/129, 168, 187; 244/24, 31, 900, 2, 4 R, 244/30
See application file for complete search history.

(56) References Cited

U.S. PATENT DOCUMENTS 5,147,429 A * 9/1992 Bartholomew et al. ........ 55/356
5,912,396 A 6/1999 Wong
6,354,535 B1 3/2002 Perry et al.

FOREIGN PATENT DOCUMENTS

| DE | 101 13 575 | 10/2002 |
| EP | 0 386 578 | 11/1994 |
| WO | WO 00/16097 | 3/2000 |
| WO | WO 2004/047962 | 6/2004 |

* cited by examiner

*Primary Examiner*—Timothy C Vanoy
(74) *Attorney, Agent, or Firm*—W. F. Fasse; W. G. Fasse

(57) ABSTRACT

An apparatus for removing harmful gas components out of the earth's atmosphere is a free-flying autonomous lightweight aircraft with an onboard gas processing system including gas separation or extraction devices, and inlets and outlets connected to the devices. Solar cells and/or thermoelectric generators provided on the craft produce electrical energy to operate the individual devices. The system may include a cryogenic closed-loop circulation system that participates in liquefying the extracted gas components. The apparatus is preferably a lighter-than-air craft like a dirigible. A method of extracting harmful gas components from the atmosphere involves flying the apparatus at a prescribed altitude level and operating the gas processing system to remove the harmful gas component from the atmosphere, then returning the apparatus to earth to offload the liquefied stored harmful gas component.

23 Claims, 4 Drawing Sheets

FLYING APPARATUS AND METHOD FOR REMOVING HARMFUL GASES FROM THE ATMOSPHERE

PRIORITY CLAIM

This application is based on and claims the priority under 35 U.S.C. §119 of German Patent Application 10 2008 015 080.0, filed on Mar. 18, 2008, the entire disclosure of which is incorporated herein by reference.

FIELD OF THE INVENTION

The invention relates to an apparatus and a method for removing harmful gases from the atmosphere.

BACKGROUND INFORMATION

It is generally reported that earth's environment is experiencing global warming as a result of an increased concentration of harmful gases, especially the so-called greenhouse gases, in the earth's atmosphere. In comparison to the self-regulating natural greenhouse effect arising from natural emissions of various gases, the additional anthropogenic greenhouse effect arising due to gases from manmade sources has resulted in the concentration of these greenhouse gases in the atmosphere increasing by more than 150 percent during the last 100 years. This has serious consequences on the atmosphere and the earth's environment, including a widely reported increase of the worldwide average temperature presumably caused by this greenhouse effect.

Various proposals have been made to reduce manmade and natural emissions of the greenhouse gases, in order to reduce (or minimize the increase of) the concentration of these gases in the atmosphere. However, such a reduction of emissions is difficult to realize and is subject to resistance on many grounds, because achieving such a reduction of emissions would require serious changes in the lifestyle, work habits, production processes, etc. that people around the globe have become accustomed to and continue to demand. Proposals have also been made to remove harmful gases from the atmosphere, for example to capture and sequester carbon from carbon-based gases in the atmosphere, but such proposals have not been shown to be effective or practical, and ground-based systems and methods cannot remove gases from various altitudes in earth's atmosphere where it is most crucial to remove such harmful gases.

SUMMARY OF THE INVENTION

In view of the above, it is an object of the invention to provide an apparatus and a method for removing harmful gases from the earth's atmosphere so as to achieve a reduction of such harmful gases present in the atmosphere. The invention especially aims to achieve such a reduction of harmful gases at various selectable altitudes in the earth's atmosphere where the reduction of such harmful gases is most crucially needed. More generally, the invention aims to provide an apparatus and a method for separating or extracting and then capturing a selected gas component from a planetary atmosphere, which may be earth's atmosphere or an extraterrestrial planetary atmosphere. The invention further aims to avoid or overcome the disadvantages of the prior art, and to achieve additional advantages, as apparent from the present disclosure. The attainment of these objects and advantages is not, however, a limitation of the claimed invention.

The above objects have been achieved according to the invention in an apparatus in the form of a platform or apparatus that can be flown or operated at a prescribable altitude range and area of the earth's atmosphere. The apparatus is preferably unmanned, free-flying and autonomously operating, for example under the control of an onboard computer controller executing a recorded control program. Alternatively, the apparatus can be remotely controlled by control commands transmitted to the apparatus in any known manner from a manned control station or a control computer on earth or on an aircraft.

The housing and body of this inventive flying apparatus are constructed with a lightweight structure, using known lightweight construction techniques and materials, such as fiber reinforced composites, fiber and metal composites, truss frames with gas envelope skins, or any other manners of construction known from the field of lightweight air vehicles including aircraft and spacecraft, and especially lighter-than-air craft such as blimps, dirigibles, zeppelins, balloons, and including rigid, semi-rigid, and non-rigid airships, etc. Such lighter-than-air airships and balloons, for example using helium as a buoyant lifting gas, can fly or float at deployment altitudes in a range from just a few meters up to 30 to 40 kilometers in the earth's atmosphere. In this text, the term "lighter-than-air" means that the craft is lighter in weight than the atmospheric gas which it displaces, i.e. less dense than the atmospheric gas in which the apparatus is flying, which may or may not be regarded as "air", for example if the apparatus is deployed in an extraterrestrial planetary atmosphere.

The inventive flying apparatus includes gas processing devices or units, such as devices or units for gas extraction, separation and/or filtering, as well as devices or units for storing and/or preparing liquid and/or gaseous products, such as storage reservoir containers including pressurized and non-pressurized liquid and/or gas storage tanks, cryogenic storage tanks, compressors, and the like. A cryogenic closed-loop circulation system can comprise or be connected to the individual gas processing devices, especially for example to capture, convert and store the selected gas component(s) as cryogenic liquid(s). The gas processing devices are communicated to the outside atmosphere through any suitable ducts, hoses, channels, passages, etc. connected to inlets and outlets through the outer covering of the flying apparatus.

Furthermore, solar cells are provided on the housing of the flying apparatus, to produce electricity necessary for operating the various devices. Also, the cryogenic closed-loop circulation system can be connected to the solar cells. Thus, each flying platform or apparatus according to the invention is equipped with a pollution-free energy generation system, which itself does not produce any harmful exhaust gases during operation. As mentioned, this preferably involves a combination of solar cells and a cryogenic closed-loop circulation system. The energy produced by this system is used to power the various devices or units for extracting the harmful gases out of the atmosphere.

A smaller portion of the produced electricity can be used to power a collision avoidance system based on a "Traffic Alert and Collision Avoidance System" (TCAS) as conventionally known in modern aviation systems. Typically, two TCAS-equipped planes flying on colliding courses are automatically controlled by their on-board TCAS controllers such that one plane holds its course while the other plane is forced to change its course, thereby avoiding collision. Such a system is especially useful for maneuvering the inventive flying apparatus to avoid collision dangers, especially if the apparatus flies through altitudes having relatively much flight traffic of other aircraft. However, it is not necessary for the inventive flying apparatus to include its own self-contained drive or propulsion system.

In other words, the inventive apparatus can purposely and expressly exclude a drive or propulsion system. The inventive apparatus can be embodied as a passive lighter-than-air craft without active propulsion, but its passive motion through the atmosphere can be controlled by steering commands to activate control surfaces for pitch, yaw and roll, and to activate a control of buoyancy to control the flight altitude. These control signals can be transmitted remotely to the flying apparatus, or can be generated by the execution of a control program in an onboard control computer. Further according to the invention, the apparatus can be towed by any conventional powered aircraft to the desired location area and altitude level, and then released to float freely in a lighter-than-air manner to extract and remove harmful gases from the atmosphere at the desired location area and altitude level. Because the apparatus is adapted to fly at different altitudes, it can also operate at different levels of the atmosphere. Thus the apparatus is also adapted to operate in different temperature ranges, so that it can separately extract various different harmful gas components at one altitude level or at different altitude levels, for example, and then store these gas components in the onboard storage facilities. The thusly stored gases or gas components can then be processed, recycled, and/or thereafter again be ejected, for example at different levels of the atmosphere or at a suitable facility back on the ground.

A number of such inventive apparatuses can be deployed to fly or float freely through the earth's atmosphere while removing the targeted harmful gases from the targeted altitude levels, and are thereby able to clean the atmosphere in an effective and lasting manner, in that they extract a significant portion of the harmful gases out of the atmosphere. An especially high effectiveness of the inventive apparatus or a plurality thereof is achieved when leverage effects can be exploited, as in the case of e.g. chlorine, because a single chlorine gas atom is able to destroy approximately one million ozone molecules. Thus, if even a single inventive apparatus is only able to extract a few chlorine atoms out of the atmosphere, then already several million ozone molecules have thereby been protected. Thus, for example, by the targeted extraction of chlorine atoms with the inventive apparatus, over a long period of time a stabilizing effect and protective effect on the earth's ozone layer can be achieved. This is, however, only one special example scenario of the application of the inventive apparatus and method. Other cleaning and protective effects can be achieved for the earth's atmosphere by the inventive apparatus and method, especially when a larger number of the apparatuses are deployed. Alternatively, an inventive flying apparatus can be deployed in another planet's atmosphere e.g. to extract and capture gas components for study, or for adjusting the planet's atmospheric gas composition.

The concept of the apparatus according to the invention is based on a combination of several different technologies that are individually already known and fully developed. The inventive apparatus does not require the new research and development "from-scratch" of a completely new technology. Thus, a mass production or series production of a large number of inventive apparatuses is easily possible.

The solar energy technology, e.g. solar photovoltaic cells, used in the apparatus according to the invention has previously been used to propel or drive aircraft which have generally been significantly heavier (and denser) than lighter-than-air airships or spacecraft. The use of a combination of such solar energy technology with an extremely light aircraft, and especially a lighter-than-air craft has instead been achieved for the first time in the present invention.

The gas extraction technology that is further utilized according to the invention has been known for use on the ground on earth predominantly in the industrial sector, for example for the liquefaction of air or other gases. Other applications in this regard are served by various different filter systems in order to filter or extract certain gas components out of a gas mixture. Thus, the previously known technologies or components that can now be employed in the inventive apparatus include devices for compression and expansion of gases, filters by which gases can be selectively separated or extracted, semipermeable membranes by which gases can be selectively separated or extracted, absorption or adsorption media by which gases can be selectively separated or extracted, catalytic cells by which gases can be processed and undergo chemical transformation reactions, ozone generators, cryogenic cooling plants, etc.

In an advantageous further particular embodiment of the inventive apparatus, the apparatus may optionally include one or more thermoelectric generators, which convert thermal energy directly to electrical energy, for example by the Peltier effect, the Seebeck effect, or the Thomson effect, for example using a thermoelectric converter, a thermionic converter, a thermocouple junction, or the like. Particularly, the thermoelectric generator can use special semiconductor materials that directly convert heat energy to electrical energy. This technology can achieve almost twice the energy efficiency of the conversion in comparison to the solar photovoltaic cells. The thermoelectric generators can be used as an alternative to, or in addition to, the photovoltaic solar cells in the inventive apparatus as discussed above.

The drive or propulsion technology using plasma wave drives and ionic propulsion drives has previously been used exclusively for scientific experimental laboratory tests and demonstrations, but has not been used in lightweight aircraft and especially lighter-than-air craft.

Overall, none of the individual technologies utilized according to the present invention in the inventive apparatus and method have previously been used in such a combination, as according to the invention, in order to extract gases out of the atmosphere.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT OF THE INVENTION

Figure 1:
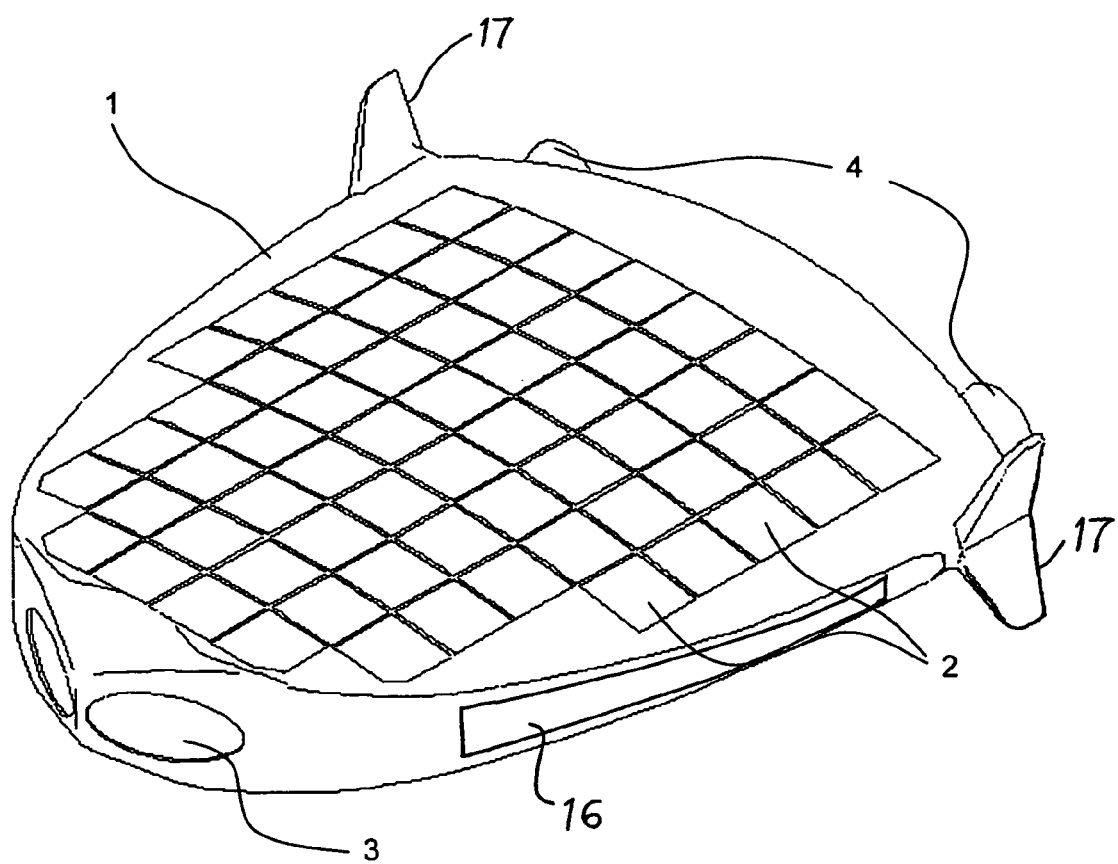
FIG. 1 is a schematic perspective view of a flying apparatus or platform for removing harmful gases from the atmosphere according to an embodiment of the invention.
Figure 2:
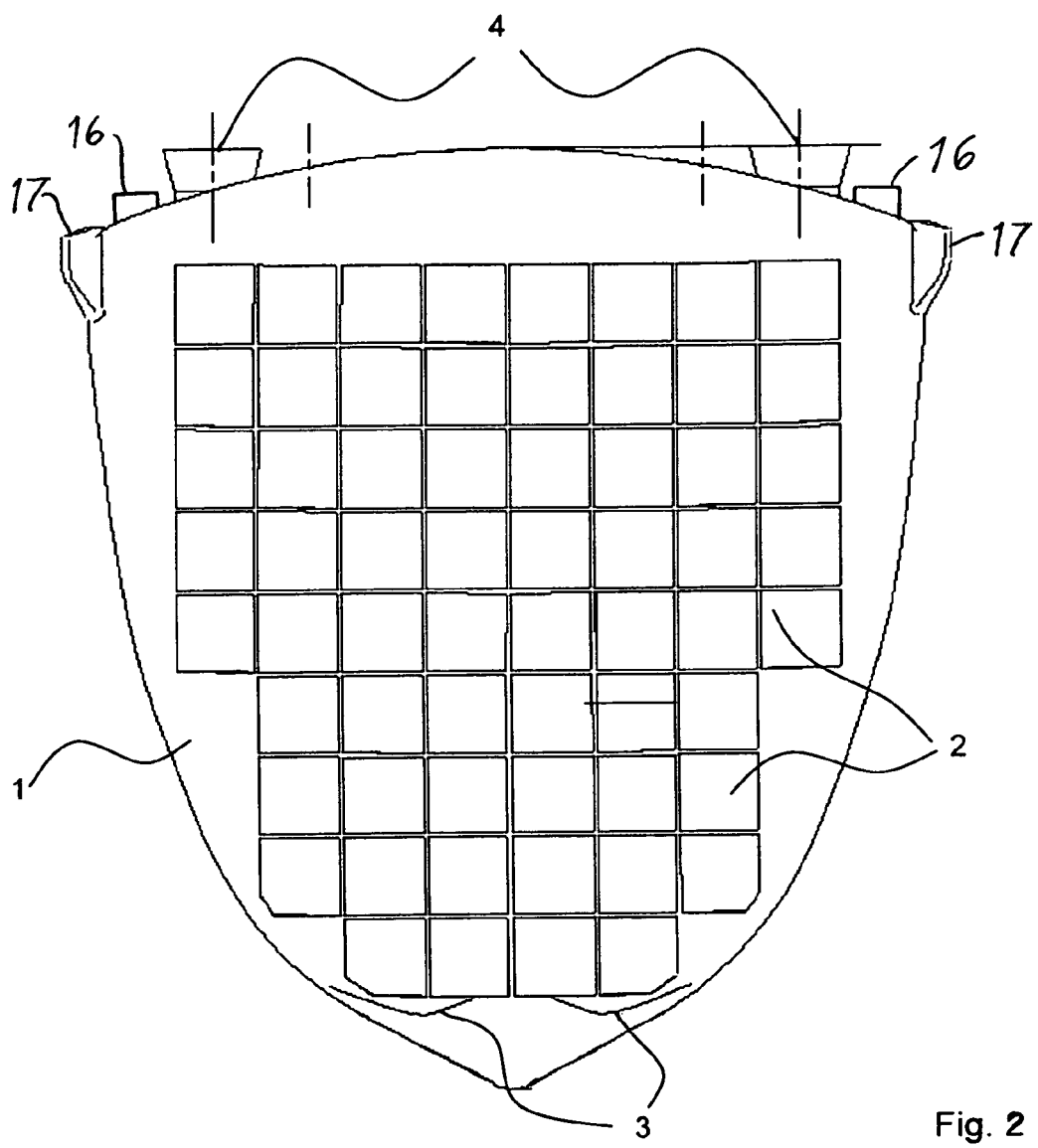
FIG. 2 is a top plan view of the apparatus according to FIG. 1.
Figure 3:
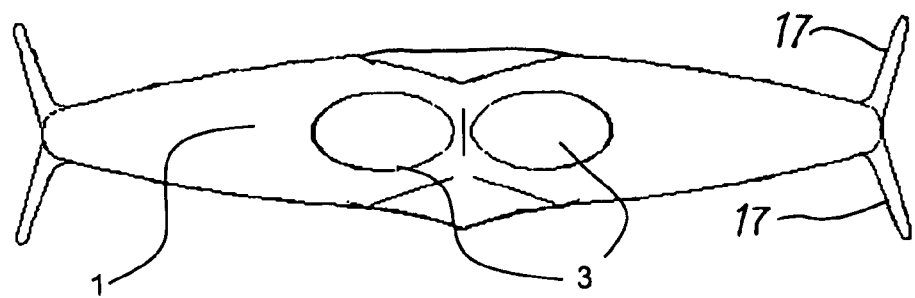
FIG. 3 is a front elevation view of the apparatus according to FIG. 1.
Figure 4:
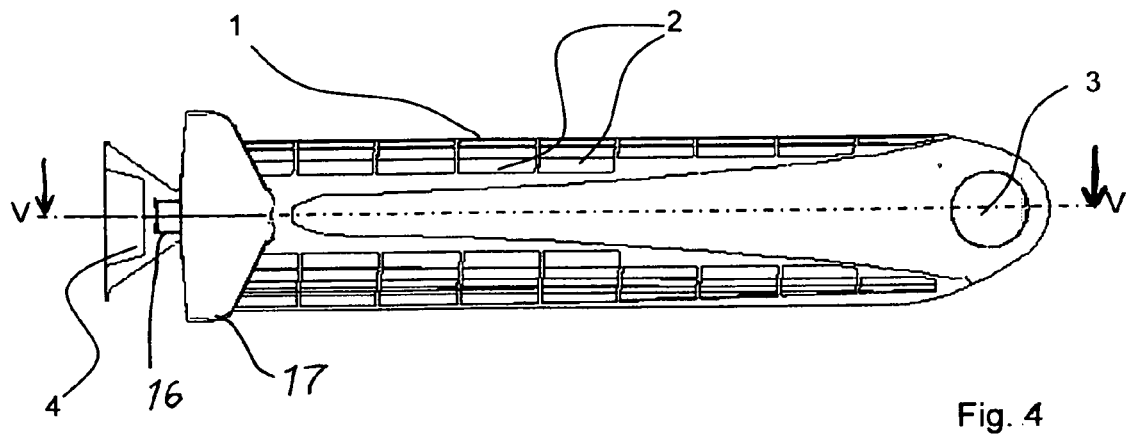
FIG. 4 is a side elevation view of the apparatus according to FIG. 1.

FIGS. 1 to 4 show schematic outside views of a flying platform or apparatus for removing harmful gases from the atmosphere according to the invention. The cell or envelope or housing 1 of the apparatus is fabricated in an extremely lightweight manner of construction, for example through the use of lightweight metallic materials, such as especially magnesium, and with the smallest possible wall thicknesses. Any lightweight manner of construction conventionally known may be used, including all of the known construction techniques for conventional lighter-than-air craft. The outer surface, and especially the upper surface, of the housing 1 of the apparatus is occupied by or provided with a number of solar photovoltaic cells 2. Furthermore, the housing 1 has diverse inlets 3 as well as outlets 4 that communicate with a system of ducts, pipes, hoses, channels, passages etc. within the apparatus. Thereby, the inlets 3 serve to introduce the surrounding atmospheric gases into the apparatus 1, and the outlets 4 serve for outputting or ejecting gaseous or liquid products produced by the internal systems, devices or units of the apparatus.

The ejection of the gaseous and/or liquid products out of the outlets 4 can also serve to propel the flying apparatus. For this purpose, the outlets 4 may have a nozzle configuration. Additionally, the apparatus 1 may include propulsion plants 16 that operate to propel the apparatus without producing any harmful gas exhaust emissions. For example, the propulsion plant 16 may be a plasma wave drive or an ionic propulsion drive, or an electric motor with a fan or propeller. Alternatively, the inventive apparatus 1 expressly excludes a propulsion plant, because it is not absolutely necessary to provide a propulsion plant for the free-flying lighter-than-air craft apparatus. The motion of the apparatus 1 through the atmosphere can be controlled and stabilized by stabilizing and control surfaces 17. Such stabilizing surfaces may be fixed, or to be active as control surfaces, these surfaces 17 may be movable and actuated by any conventionally known actuator system, in response to control commands, so as to steer the motion of the apparatus 1 through the atmosphere with respect to roll, pitch and yaw.

Figure 5:
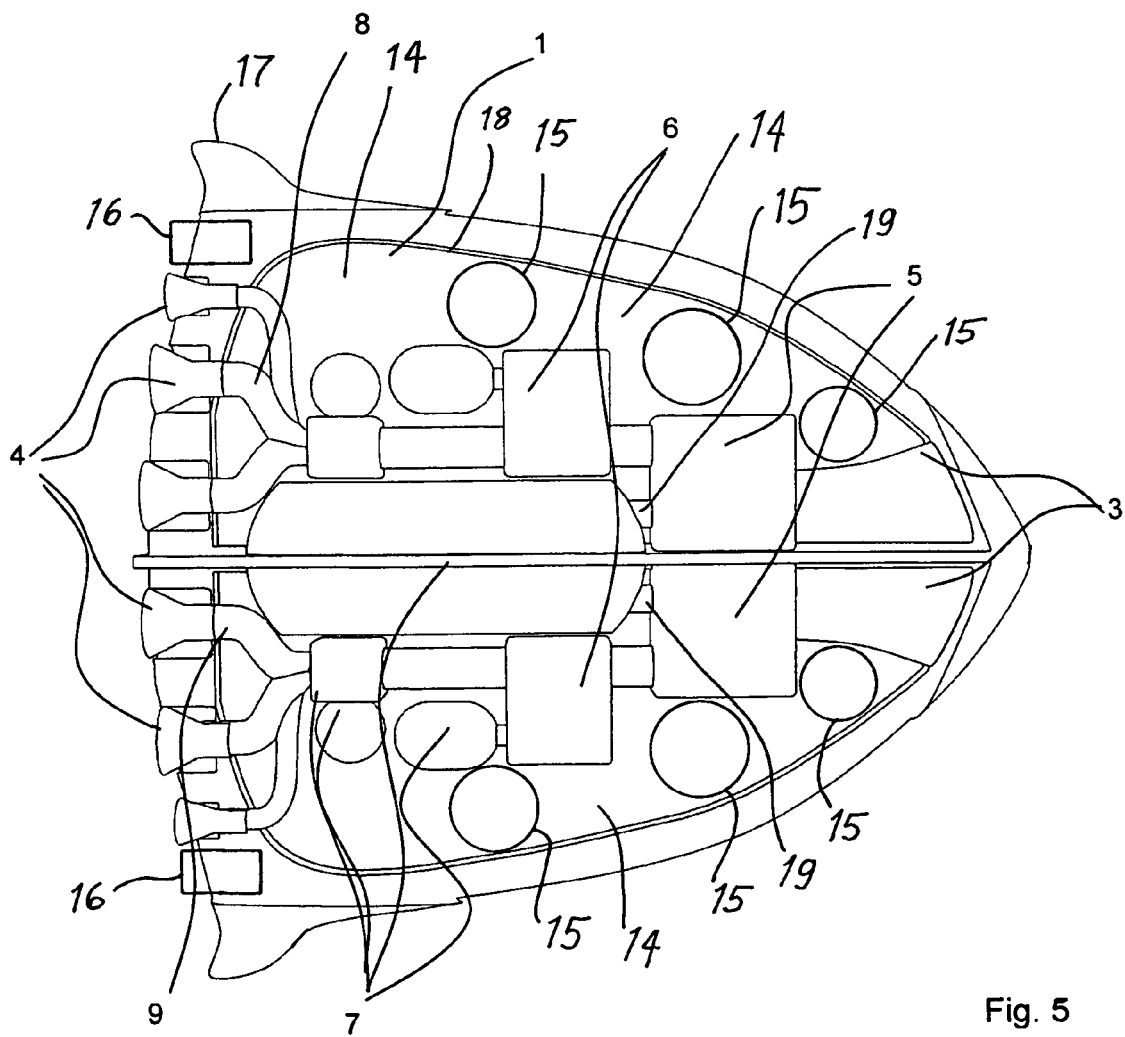
FIG. 5 is a schematic horizontal sectional view along the section line V-V through the apparatus according to FIG. 4.

As can be seen in the schematic sectional view of FIG. 5, the free-flying or free-floating motion of the inventive apparatus 1 follows the principles of lighter-than-air craft such as balloons, blimps, dirigibles, zeppelins, etc. Particularly, the outer skin or envelope of the apparatus 1, or an internal containment envelope 18, contains a buoyant lifting gas 14 such as helium. The buoyant lift produced by the helium exceeds the weight of the entire apparatus 1, so that it floats in the atmosphere in the manner of a lighter-than-air craft. The amount of buoyant lift produced by the buoyant lifting gas 14 is controlled by the selective air inflation or deflation of ballonets 15 also enclosed within the apparatus skin or the containment envelope 18. Thereby, the variable volume of these inflatable air sacks or ballonets 15 changes the volume of the buoyant lifting gas 14 and thus causes and controls an ascent or descent of the floating apparatus. In general, thus, the take-off and landing of the floating apparatus 1 can be carried out in the manner and according to the same principles as for a zeppelin or dirigible.

FIG. 5 further schematically shows an example of the technical construction principles of the gas processing system of the inventive apparatus 1, for example including compression units 5 having gas intakes connected to the inlets 3, and outlets leading to gas separation or extraction units 6 for separating liquid phases, e.g. liquefied gas components, out of the gas mixture that is to be separated or cleaned. Alternatively or additionally, as discussed above, the gas separation or extraction units can include filters, semipermeable membranes, absorption media, adsorption media, catalytic cells, or the like, for extracting gaseous components out of the introduced gas mixture that is to be cleaned of harmful gases. The system further includes storage reservoir containers 7 for storing the various different gas components, or liquefied gas components that have been separated from the gas mixture. The system still further includes radiation units 8 using radiation applied to the gas for the fission or splitting of gas molecules and radicals, as well as ozone generators 9 connected upstream from the outlets 4. Thus, the atmospheric gas mixture is introduced at the inlets 3, processed through the overall gas processing system to remove one or more harmful gas components therefrom and/or to add ozone or other converted gas components, and the resulting cleaned and processed gas is ejected out of the outlets 4 back into the atmosphere.

Figure 6:
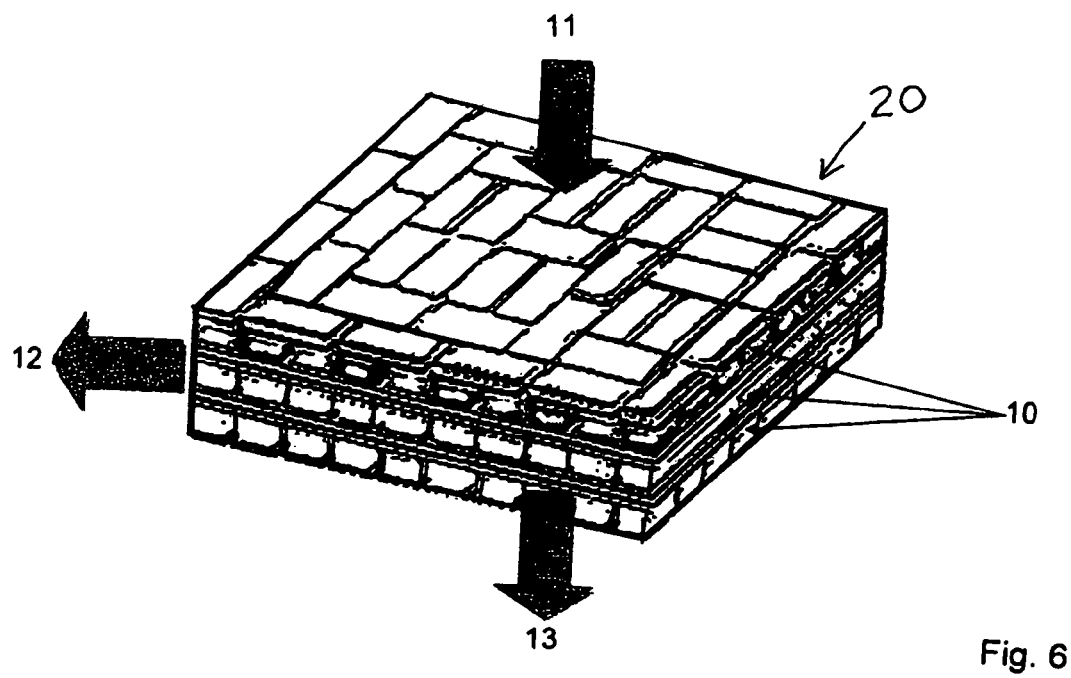
FIG. 6 is an enlarged detail perspective view demonstrating the basic operation principle of a thermoelectric generator used in the inventive apparatus.

The electrical energy for operating the various individual electrically driven units 5 to 9 is produced by solar photovoltaic cells 2 (see FIGS. 1, 2 and 4) and/or thermoelectric generators 20 (see FIG. 6). As is conventionally known, the solar photovoltaic cells 2 generate electricity through the light induced generation of charge carriers in a semiconductor material. As schematically represented in FIG. 6, the thermoelectric generator 20 preferably also is based on semiconductor material 10 that is arranged in layers. The thermoelectric generator 20 is subjected to incident concentrated sunshine or solar radiation 11, which heats the semiconductor material 10. By a thermoelectric conversion process, the heated semiconductor material 10 converts at least some of the heat to electrical energy 12, while the remaining heat or thermal energy 13 escapes from the thermoelectric generator 20 or is passed on to another system on board the inventive apparatus 1. Further in this regard, the apparatus can additionally include a cryogenic closed-loop circuit or circulation system indicated schematically at 19 in FIG. 5, that is connected to the individual gas extraction devices for example, and that participates in the liquefaction of gaseous components, for example, as well as in the energy production system.

During the operation of the free-flying or free-floating apparatus 1, one or more gas components are extracted out of the atmospheric gas and stored in liquid or gaseous form in the storage reservoir containers 7. Therefore, the weight of the apparatus 1 increases, which tends to cause the apparatus 1 to descend. Such descent can be controlled or regulated by appropriately adjusting the ballonets 15 to achieve greater buoyant lift. Alternatively, if a descent due to the increased weight is desired, or once the weight exceeds the maximum lift capacity, then the apparatus 1 will descend toward the earth's surface to a lower altitude level. When the apparatus 1 reaches a prescribed altitude level, some of the stored liquefied or gaseous components, such as water for example, can simply be released and ejected from the apparatus 1. Such a released liquid component then returns to the earth as rain, for example, without any harmful effects. After such a release of harmless liquid components, the apparatus 1 is again lighter and can ascend to its normal operating altitude level. When a maximum capacity of harmful components has been reached, the apparatus 1 descends and lands in the manner of a dirigible at a suitable earth-based ground station, where the liquefied harmful components are then emptied from the storage reservoir containers 7 through suitable pipe connections or the like. Those harmful components can then be further processed or recycled into harmless substances on the ground. While the apparatus is docked on the ground, any necessary service or maintenance is also performed, for example recharging or refilling the onboard cryogenic system with a cryogenic liquid. After the storage tanks 7 have been emptied, the apparatus 1 again has a lower weight so that it readily ascends once again to its prescribed operating altitude level, where it continues the extraction of harmful gas components out of the atmosphere. The landing, take-off, ascent and descent of the flying apparatus are carried out according to the principles of operation of a dirigible as described above, under autonomous control or by remote control commands.

The term "or" as used herein is not an "exclusive or" but rather encompasses the meaning of "and/or" unless a specific context dictates the meaning of an exclusive either/or.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for removing a selected gas component from a planetary atmosphere, comprising a lighter-than-air flying craft that is adapted to fly in the planetary atmosphere and that comprises:
   a housing;
   a gas containment envelope in said housing containing a buoyant lifting gas;
   a gas processing system that is arranged in said housing and that includes a gas separation or extraction device and a storage reservoir container connected for gas or liquid communication with said gas separation or extraction device;
   a gas inlet and a gas outlet respectively passing out of said housing and respectively communicating said gas processing system with the planetary atmosphere outside of said housing;
   an electrical generation system including at least one of a solar photovoltaic cell or a thermoelectric generator that is mounted to face outwardly on said housing and that has an electrical output that is electrically connected to a power input of said gas separation or extraction device; and
   a cryogenic closed-loop circulation system connected to at least one of said solar photovoltaic cell or said thermoelectric generator or said gas separation or extraction device;
   wherein said gas separation or extraction device is arranged and adapted to receive atmospheric gas from the planetary atmosphere through said gas inlet and to remove, in gaseous or liquid form, at least some of the selected gas component from the atmospheric gas to produce a remaining cleaned gas, said storage reservoir container is arranged and adapted to receive and store the selected gas component in gaseous or liquid form, and said gas outlet is arranged and adapted to eject the remaining cleaned gas to the planetary atmosphere.

2. An apparatus for removing a selected gas component from a planetary atmosphere, comprising a lighter-than-air flying craft that is adapted to fly in the planetary atmosphere and that comprises:
   a housing;
   a gas containment envelope in said housing containing a buoyant lifting gas;
   a gas processing system that is arranged in said housing and that includes a gas separation or extraction device, a storage reservoir container connected for gas or liquid communication with said gas separation or extraction device, and a cryogenic closed-loop circulation system connected to said gas separation or extraction device; and
   a gas inlet and a gas outlet respectively passing out of said housing and respectively communicating said gas processing system with the planetary atmosphere outside of said housing;
   wherein said gas separation or extraction device is arranged and adapted to receive atmospheric gas from the planetary atmosphere through said gas inlet and to cooperate with said cryogenic closed-loop circulation system to remove, in gaseous or liquid form, at least some of the selected gas component from the atmospheric gas to produce a remaining cleaned gas, said storage reservoir container is arranged and adapted to receive and store the selected gas component in gaseous or liquid form, and said gas outlet is arranged and adapted to eject the remaining cleaned gas to the planetary atmosphere.

3. An apparatus for removing a selected gas component from earth's atmosphere, comprising a flying craft that is adapted to fly in earth's atmosphere and that comprises:
   a housing;
   a gas processing system that is arranged in said housing and that includes a gas separation or extraction device and a storage reservoir container connected for gas or liquid communication with said gas separation or extraction device;
   a gas inlet and a gas outlet respectively passing out of said housing and respectively communicating said gas processing system with earth's atmosphere outside of said housing;
   an electrical generation system including at least one of a solar photovoltaic cell or a thermoelectric generator that is mounted to face outwardly on said housing and that has an electrical output that is electrically connected to a power input of said gas separation or extraction device; and
   a cryogenic closed-loop circulation system connected to at least one of said solar photovoltaic cell or said thermoelectric generator or said gas separation or extraction device;
   wherein said gas separation or extraction device is arranged and adapted to receive atmospheric air from earth's atmosphere through said gas inlet and to remove, in gaseous or liquid form, at least some of the selected gas component from the atmospheric air to produce a remaining cleaned gas, said storage reservoir container is arranged and adapted to receive and store the selected gas component in gaseous or liquid form, and said gas outlet is arranged and adapted to eject the remaining cleaned gas to the earth's atmosphere.

4. The apparatus according to claim 3, wherein said electrical generation system includes said thermoelectric generator.

5. The apparatus according to claim 3, wherein said electrical generation system includes said solar photovoltaic cell.

6. The apparatus according to claim 5, wherein said cryogenic closed-loop circulation system is connected to said solar photovoltaic cell.

7. The apparatus according to claim 3, wherein said cryogenic closed-loop circulation system is connected to said gas separation or extraction device.

8. The apparatus according to claim 3, wherein said housing has a lightweight construction and includes a gas containment envelope that contains a buoyant lifting gas, such that said flying craft is a lighter-than-air craft.

9. The apparatus according to claim 3, expressly excluding any propulsion drive plant.

10. The apparatus according to claim 3, further comprising a propulsion drive plant that produces no harmful exhaust gas emissions.

11. The apparatus according to claim 10, wherein said propulsion drive plant comprises a plasma wave drive or an ionic propulsion drive.

12. The apparatus according to claim 10, wherein said propulsion drive plant is a part of a collision avoidance system further included in said apparatus.

13. The apparatus according to claim 3, wherein said gas separation or extraction device comprises a compressor.

14. The apparatus according to claim 3, wherein said gas separation or extraction device comprises a cryogenic cooling device adapted to liquefy the selected gas component.

15. The apparatus according to claim 3, wherein said gas separation or extraction device comprises a gas filter arrangement.

16. The apparatus according to claim 3, wherein said gas separation or extraction device comprises a semi-permeable membrane adapted to separate the selected gas component from the atmospheric air.

17. The apparatus according to claim 3, wherein said gas separation or extraction device comprises an adsorption medium or an absorption medium adapted to separate the selected gas component from the atmospheric air.

18. The apparatus according to claim 3, wherein said gas separation or extraction device comprises a catalytic cell adapted to support a catalytic reaction that separates the selected gas component from the atmospheric air.

19. The apparatus according to claim 3, wherein said gas separation or extraction device comprises a radiation unit adapted to emit energetic radiation to split molecules of the atmospheric air so as to separate the selected gas component from the atmospheric air.

20. The apparatus according to claim 3, wherein said gas processing system further comprises an ozone generator connected to said gas outlet.

21. A method of operating the apparatus according to claim 3 to remove at least some of the selected gas component from the atmospheric air, comprising the steps:
a) flying said flying craft by buoyantly floating said flying craft in earth's atmosphere to a selected altitude range above earth's surface;
b) at said selected altitude range, operating said gas processing system including said gas separation or extraction device to remove, in gaseous or liquid form, at least some of the selected gas component from the atmospheric air inducted into the gas inlet, so as to produce from the atmospheric air a remaining cleaned gas;
c) receiving and storing the selected gas component in gaseous or liquid form in said storage reservoir container;
d) emitting the remaining cleaned gas into earth's atmosphere; and
e) descending said flying craft to the earth's surface, and offloading said selected gas component from said storage reservoir container to a ground-based facility.

22. The apparatus according to claim 7, wherein said cryogenic closed-loop circulation system is further connected to at least one of said solar photovoltaic cell or said thermoelectric generator.

23. The apparatus according to claim 10, wherein said cryogenic closed-loop circulation system is connected to at least one of said solar photovoltaic cell or said thermoelectric generator, and is further connected to said propulsion drive plant such that energy produced by said electrical generation system and said cryogenic closed-loop circulation system is supplied to said propulsion drive plant.

* * * * *